United States Patent
Garcia Azorero et al.

(10) Patent No.: US 12,160,448 B2
(45) Date of Patent: Dec. 3, 2024

(54) USAGE MONITORING DATA CONTROL

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Irene Martin Cabello, Madrid (ES); Antonio Iniesta Gonzalez, Madrid (ES); Ignacio Rivas Molina, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 582 days.

(21) Appl. No.: 17/294,649

(22) PCT Filed: Sep. 24, 2019

(86) PCT No.: PCT/IB2019/058095
§ 371 (c)(1),
(2) Date: May 17, 2021

(87) PCT Pub. No.: WO2020/104867
PCT Pub. Date: May 28, 2020

(65) Prior Publication Data
US 2022/0014562 A1    Jan. 13, 2022

(51) Int. Cl.
*H04L 9/40* (2022.01)
*H04L 43/08* (2022.01)
*H04L 67/02* (2022.01)

(52) U.S. Cl.
CPC .............. *H04L 63/20* (2013.01); *H04L 43/08* (2013.01); *H04L 67/02* (2013.01)

(58) Field of Classification Search
CPC ......... H04L 63/20; H04L 43/08; H04L 67/02; H04L 41/0894; H04L 41/5009;
(Continued)

(56) References Cited

U.S. PATENT DOCUMENTS 10,581,649 B2    3/2020  Feng et al.
11,659,433 B2*   5/2023  Atarius ............... H04L 65/1069
                                                      455/404.1
(Continued)

FOREIGN PATENT DOCUMENTS

CN    103490908 A    1/2014
CN    106464667 A    2/2017
(Continued)

OTHER PUBLICATIONS

3GPP TS 29.59 V15.1.0 (Sep. 2018), 3rd Generation Partnership Project; Technical Specification Group Core Network and Terminals; 5G System; Usage of the Unified Data Repository service for Policy Data, Application Data and Structured Data for Exposure; Stage 3 (Release 15) Sep. 2018 (pp. 1-6,10,11,14-17, 27-30, 42) (18 total pages).
(Continued)

*Primary Examiner* — Abu S Sholeman
(74) *Attorney, Agent, or Firm* — Rothwell, Figg, Ernst & Manbeck, P.C.

(57) ABSTRACT

A method that includes a policy function transmitting to a depository function a request for information; and the policy function receiving a response to the request, wherein the response comprises: a usageMonDataLimit instance comprising a limit identifier; and a usageMonData instance corresponding to the usageMonDataLimit instance, wherein the usageMonData instance also comprises the limit identifier.

23 Claims, 6 Drawing Sheets

(58) Field of Classification Search
CPC ... H04L 43/0876; H04L 41/0893; H04L 9/32; H04W 4/26

See application file for complete search history.

(56) References Cited

U.S. PATENT DOCUMENTS

| | | | | |
|---|---|---|---|---|
| 2004/0187036 | A1* | 9/2004 | Nakamura | G06F 21/6218 726/7 |
| 2008/0084977 | A1* | 4/2008 | Nayak | H04M 15/00 379/130 |
| 2011/0276442 | A1* | 11/2011 | Momtahan | H04M 15/88 455/406 |
| 2012/0030331 | A1* | 2/2012 | Karampatsis | H04M 15/66 709/223 |
| 2012/0117235 | A1 | 5/2012 | Castro Castro et al. | |
| 2012/0136992 | A1* | 5/2012 | Lopez Nieto | H04L 12/1407 709/224 |
| 2012/0233324 | A1 | 9/2012 | Zhou et al. | |
| 2013/0122860 | A1* | 5/2013 | Dhruva | H01Q 1/38 455/406 |
| 2015/0067183 | A1* | 3/2015 | Cha | H04L 47/20 709/228 |
| 2016/0330328 | A1* | 11/2016 | Garg | H04W 4/24 |
| 2018/0278459 | A1 | 9/2018 | Prasad et al. | |
| 2018/0324492 | A1* | 11/2018 | Deshpande | H04N 21/4516 |
| 2020/0221541 | A1* | 7/2020 | Yan | H04W 48/16 |

FOREIGN PATENT DOCUMENTS

| | | | |
|---|---|---|---|
| EP | 2 467 970 | A1 | 6/2012 |
| JP | 2013-541278 | A | 11/2013 |
| JP | 2014-195252 | A | 10/2014 |
| JP | 2017-529810 | A | 10/2017 |
| WO | 2011/060698 | A1 | 5/2011 |
| WO | 2013/048187 | A2 | 4/2013 |

OTHER PUBLICATIONS

3GPP TS 29.519 V15.2.0 (Dec. 2018), 3rd Generation Partnership Project; Technical Specification Group Core Network and Terminals; 5G System; Usage of the Unified Data Repository service for Policy Data, Application Data and Structured Data for Exposure; Stage 3 (Release 15) Dec. 2018 (pp. 1-6,30,31) (9 total pages ).

3GPP TS 23.502 V15.3.0 (Sep. 2018), 3rd Generation Partnership Project; Technical Specification Group Services and System Aspects; Procedures for the 5G System; Stage 2 (Release 15) Sep. 2018 (330 pages).

International Search Report and Written Opinion issued in International Application No. PCT/IB2019/058095 dated Jun. 17, 2020 (11 pages).

IPRP issued in International Application No. PCT/IB2019/058095 dated Jan. 14, 2021 (8 pages).

3GPP TS 23.203 V15.0.0 (Sep. 2017), 3rd Generation Partnership Project; Technical Specification Group Services and System Aspects; Policy and charging control architecture (Release 15), Sep. 2017 (257 pages).

3GPP TS 23.503 V15.0.0 (Dec. 2017), 3rd Generation Partnership Project; Technical Specification Group Services and System Aspects; Policy and Charging Control Framework for the 5G System; Stage 2 (Release 15), Dec. 2017 (56 pages).

3GPP TS 29.513 V15.0.0 (Jun. 2018), 3rd Generation Partnership Project; Technical Specifcation Group Core Network and Terminals; 5G System; Policy and Charging Control signaling flows and QoS parameter mapping; Stage 3 (Release 15), Jun. 2018 (55 pages).

3GPP TS 29.519 V15.0.0 (Jun. 2018), 3rd Generation Partnership Project; Technical Specification Group Core Network and Terminals; 5G System; Usage of the Unified Data Repository service for Policy Data, Application Data and Structured Data for Exposure; Stage 3 (Release 15), Jun. 2018 (42 pages).

3GPP TS 29.519 V15.1.0 (Sep. 2018), 3rd Generation Partnership Project; Technical Specification Group Core Network and Terminals; 5G System; Usage of the Unified Data Repository service for Policy Data, Application Data and Structured Data for Exposure; Stage 3 (Release 15) Sep. 2018 (pp. 1-6,10,11,14-17, 27-30, 42) (18 total pages).

3GPP TS 29.519 V15.1.0 (Sep. 2018), 3rd Generation Partnership Project; Technical Specification Group Core Network and Terminals; 5G System; Usage of the Unified Data Repository service for Policy Data, Application Data and Structured Data for Exposure; Stage 3 (Release 15) Sep. 2018 (85 pages).

3GPP TS 23.203 V15.4.0 (Sep. 2018), 3rd Generation Partnership Project; Technical Specification Group Services and System Aspects; Policy and charging control architecture (Release 15) Sep. 2018 (262 pages).

3GPP TS 23.503 V15.3.0 (Sep. 2018), 3rd Generation Partnership Project; Technical Specification Group Services and System Aspects; Policy and Charging Control Framework for the 5G System; Stage 2 (Release 15) Sep. 2018 (70 pages).

3GPP TS 29.512 V15.1.0 (Sep. 2018), 3rd Generation Partnership Project; Technical Specification Group Core Network and Terminals; 5G System; Session Management Policy Control Service; Stage 3 (Release 15) Sep. 2018 (112 pages).

3GPP TS 29.513 V15.1.0 (Sep. 2018), 3rd Generation Partnership Project; Technical Specification Group Core Network and Terminals; 5G System; Policy and Charging Control signalling flows and QoS parameter mapping; Stage 3 (Release 15) Sep. 2018 (69 pages).

3GPP TS 29.594 V15.1.0 (Sep. 2018), 3rd Generation Partnership Project; Technical Specification Group Core Network and Terminals; 5G System; Spending Limit Control Service; Stage 3 (Release 15) Sep. 2018 (29 pages).

3GPP TSG-CT WG3 Meeting #98Bis, C3-186391, Vilnius, Lithuania, Oct. 15-19, 2018 (15 pages).

ETSI TS 123 502 V15.2.0 (Jun. 2018) (311 pages).

\* cited by examiner

USAGE MONITORING DATA CONTROL

CROSS REFERENCE TO RELATED APPLICATIONS

This application is a 35 U.S.C. § 371 National Stage of International Patent Application No. PCT/IB2019/058095, filed Sep. 24, 2019, designating the United States, which claims priority to U.S. provisional patent application 62/769,095, filed on Nov. 19, 2018. The above identified applications are incorporated by this reference.

TECHNICAL FIELD

This disclosure relates to management of usage monitoring data.

BACKGROUND

Usage monitoring functionality allows a network operator to control the data usage of the subscriber. This can be done at service level or per PDU session level. For example, a network operator may specify that a certain subscriber may not download more than 5 Gigabytes of Netflix data per month.

The usage monitoring functionality is controlled by a network node that implements a policy function (e.g., the 4G Policy and Charging Rules Function (PCRF) or the 5G Policy Control Function (PCF)). A monitoring key is assigned by the policy function (e.g., PCRF/PCF) in order to allow a traffic handling network function (e.g., the 4G PGW/UP or 5G SMF/UPF) to monitor the traffic associated to that monitoring key.

The monitoring key is assigned by the policy function and is provided as part of the policy rules (e.g., PCC rule(s)) when monitoring applies at service level or as part of the session information when the monitoring applies to a session (e.g., IP-CAN/PDU session). All the service data flows or applications that share the same monitoring key will have a common allowed usage for a subscriber's terminal device (also known as user equipment (UE)) on an APN (4G)/DNN (5G) basis.

Usage monitoring information is stored in the SPR (4G) or UDR (4G & 5G).

The interface towards the data base is not specified for Non-5G scenarios. In 5G, 3GPP TS 23.503 (stage 2) and TS 29.519 (stage 3) specify the interface between the PCF and UDR.

SUMMARY

Certain challenges currently exist. 3GPP TS 29.519 V15.1.0 ("TS 29.519") specifies the interface between the PCF and the Unified Data Repository (UDR). According to TS 29.519, a specific resource is defined to control the usage monitoring information. The usage monitoring information is stored according to this structure: {apiRoot}/nudr-dr/v1/policy-data {ueId}/sm-data/{usageMonId}.

The PCF can create a usage monitoring resource in order to store the remaining usage related to a UsageMonId. This resource can also be removed once the corresponding limit no longer exists. The PCF can get and modify usage monitoring information associated with a UE id and usage-MonId at any moment during the lifetime of a PDU session:

| | | | |
|---|---|---|---|
| UsageMonitoringInformation | {apiRoot}/nudr-dr/v1/ policy-data{ueId}/sm-data/{usageMonId} | GET | Retrieve a usage monitoring resource. |
| | | PUT | Create a usage monitoring resource |
| | | DELETE | Delete a usage monitoring resource. |

It is not specified how the PCF derives the usageMonId or how the usageMonId relates with the information in the usage limits (UsageMonDataLimit data type) or in the monitoring data (UsageMonData).

The resource definition for the UsageMonitoringInformation resource does not clearly define which identifier to use in the "usageMonId" variable field.

It may be assumed that the "usageMonId" variable field corresponds to the monitoring key that the PCF uses to monitor the traffic towards the SMF. But, if the monitoring key is used in the "usageMonId", then it is necessary to restrict the scope of the monitoring key as currently specified (i.e., per UE and DNN). The following possible new scopes of the monitoring key values could be considered.

1) Scoping the monitoring key values per S-NSSAI/DNN pair. But if the monitoring key values are scoped per S-NSSAI/DNN pair, then this would restrict the possibility of accumulating usage for different S-NSSAI/DNN combinations. In addition the following modifications would be required to the current specification: a UsageMonitoringInformation individual resource may represent accumulated usage information corresponding to different limits. As a consequence, UsageMonData needs to be updated to include S-NSSAI/DNN information, and to keep a higher control during accumulator updates, PATCH method should be used instead of PUT.

2) Scoping the monitoring key values per limit definition so that the same monitoring key value is allocated for the DNN/S-NSSAI pairs that belong to the same limit definition and different limits always get different values for the monitoring keys. If this is done, then this would restrict the way the monitoring key is defined today, linking the accumulation usage with the monitoring usage in the SMF. The following implications would need to be considered: a UsageMonitoringInformation individual resource represents accumulated usage information corresponding to a limit. Consequently, DNN/S-NSSAI information is not relevant for the UsageMonitoringInformation resource, since it is considered in the limit definition in the Sm-Data resource. S-NSSAI/DNN query parameters can be removed.

3) Scoping the monitoring key values per deployment, so that the values for monitoring keys are unique. This leads to a UsageMonitoringInformation individual resource represents the accumulated usage information corresponding to the latest update for a 5-NSSAI/DNN pair. Consequently, DNN/S-NSSAI information is not relevant for the UsageMonitoringInformation resource, since it is considered in the limit definition in the Sm-Data resource, which already includes the monitoring key. S-NSSAI/DNN query parameters can be removed, and UsageMonitoringInformation individual resource does not contain accurate limits information, but the remaining value at the last PDU session update.

Each of the above possibilities restrict the way the monitoring key is used today that decouples its usage in the context of usage monitoring in the SMF/UPF from the way the accumulation is performed in the user data base.

Accordingly, this disclosure proposes to use an identifier in the "usageMonId" resource identifier (e.g., URI) variable that identifies a certain usage limit. This identifier may be referred to as the "Accumulator/Limit Identifier" or ("limitId" for short). A UsageMonitoringInformation individual resource represents accumulated usage information corresponding to a certain limit identified by a limit identifier. Consequently, there is no restriction in the definition of the monitoring key values. This solution also requires that the limitId be included in the UsageMonDataLimit and UsageMonData data types. An advantage of the proposed solution is that it provides the highest degree of flexibility respecting the current scope of the monitoring key. The proposed solution also allows a decoupling of the use of the monitoring key from the way the accumulation is done in the UDR, and further allows flexible models in the way the accumulation is done. There is no restriction in the definition of the monitoring key, allowing different business models where the accumulation can be done per different combinations of DNN and S-NSSAI. A further advantage is that there is no impact in the way usage monitoring has been specified.

Accordingly, in one aspect a method is provided wherein the method includes a policy function (e.g., PCF) transmitting to a depository function (e.g., UDR) a request for information. The method also includes the policy function receiving a response, wherein the response comprises: a usageMonDataLimit instance comprising a limit identifier; and a usageMonData instance corresponding to the usageMonDataLimit instance, wherein the usageMonData instance also comprises the limit identifier.

In some embodiments, the method also includes, prior to transmitting the request, the policy function receiving a request from a management function; and, in response to the request, the policy function determining whether or not the policy function needs to fetch the information from the depository function.

In some embodiments the method also includes the policy function transmitting to the depository function a request requesting the depository function to provide a notification to the policy function when changes occur to the UsageMonData instance associated with the UsageMonDataLimit instance.

In some embodiments the method also includes the policy function transmitting to the depository function an update request. In some embodiments, the update request is an HTTP PATCH request comprising a UsageMonData instance comprising the limit identifier, or the update request is an HTTP PUT request comprising a resource identifier (e.g., a URI) comprising the limit identifier.

In some embodiments the method also includes the policy function transmitting to the depository function an unsubscribe request, wherein transmitting the unsubscribe request comprises transmitting an HTTP PUT request comprising a body comprising a resource identifier comprising the limit identifier.

In some embodiments, the usageMonDataLimit instance further comprises at least one of: a usage monitoring level instance indicating whether the usageMonDataLimit instance applies at a PDU session level or a service level, start date information indicating a start date and time, end date information indicating an end date and time, a usage limit threshold value indicating a maximum allowed traffic volume, or a reset period for use in indicating a time at which an allowed usage needs to be reset.

In some embodiments, the usageMonDataLimit instance further comprises a data scope indicating an S-NSSAI and DNN combination to which the usageMonDataLimit instance applies.

In some embodiments, the usageMonData instance further comprises at least one of: a usage monitoring level, umLevel, instance indicating whether the usageMonData instance applies at PDU session level or at service level, or an allowed usage value, wherein the allowed usage value indicates a remaining allowed traffic volume, and/or the allowed usage value indicates a remaining length of time.

In some embodiments, the usageMonData instance further comprises information indicating a time at which to reset an allowed usage to the usage limit threshold value.

In another aspect a method is provided wherein the method includes a depository function (e.g., UDR) receiving a request for information from a policy function (e.g., PCF). The method also includes the depository function transmitting a response in response to the request, wherein the response comprises: a usageMonDataLimit instance comprising a limit identifier; and a usageMonData instance corresponding to the usageMonDataLimit instance, wherein the usageMonData instance also comprises the limit identifier.

In some embodiments the method also includes the depository function receiving an update request from the policy function. In some embodiments, the update request is an HTTP PATCH request comprising a UsageMonData instance comprising the limit identifier, or the update request is an HTTP PUT request comprising a resource identifier comprising the limit identifier.

In some embodiments the method also includes the depository function receiving an unsubscribe request from the policy function. In some embodiments, the unsubscribe request is an HTTP PUT request comprising a body comprising a resource identifier comprising the limit identifier.

In some embodiments, the usageMonDataLimit instance further comprises at least one of: a usage monitoring level instance indicating whether the usageMonDataLimit instance applies at a PDU session level or at a service level, start date information indicating a start date and time, end date information indicating an end date and time, a usage limit threshold value indicating a maximum allowed traffic volume, or a reset period for use in indicating a time at which an allowed usage needs to be reset.

In some embodiments, the usageMonDataLimit instance further comprises a data scope indicating an S-NSSAI and DNN combination to which the usageMonDataLimit instance applies.

In some embodiments, the usageMonData instance further comprises at least one of: a usage monitoring level, umLevel, instance indicating whether the usageMonData instance applies at a PDU session level or at a service level, or an allowed usage value, wherein the allowed usage value indicates a remaining allowed traffic volume, and/or the allowed usage value indicates a remaining length of time.

In some embodiments, the usageMonData instance further comprises information indicating a time at which to reset an allowed usage to the usage limit threshold value.

In another aspect there is provided a computer program comprising instructions which when executed by processing circuitry of an apparatus causes the apparatus to perform the methods described herein. In another aspect, there is provided a carrier containing the computer program described in the previous paragraph, wherein the carrier is one of an electronic signal, an optical signal, a radio signal, and a computer readable storage medium.

In another aspect there is provided a policy function apparatus. The policy function apparatus is adapted to transmit to a depository function a request for information and receive a response to the request. The response includes a usageMonDataLimit instance comprising a limit identifier and a usageMonData instance corresponding to the usageMonDataLimit instance, wherein the usageMonData instance also comprises the limit identifier.

In another aspect there is provided a depository function apparatus. The depository function apparatus is adapted to receive a request for information from a policy function and transmit a response in response to the request from the policy function. The response comprises: a usageMonDataLimit instance comprising a limit identifier and a usageMonData instance corresponding to the usageMonDataLimit instance, wherein the usageMonData instance also comprises the limit identifier.

BRIEF DESCRIPTION OF THE DRAWINGS

The accompanying drawings, which are incorporated herein and form part of the specification, illustrate various embodiments.

DETAILED DESCRIPTION

Figure 1:
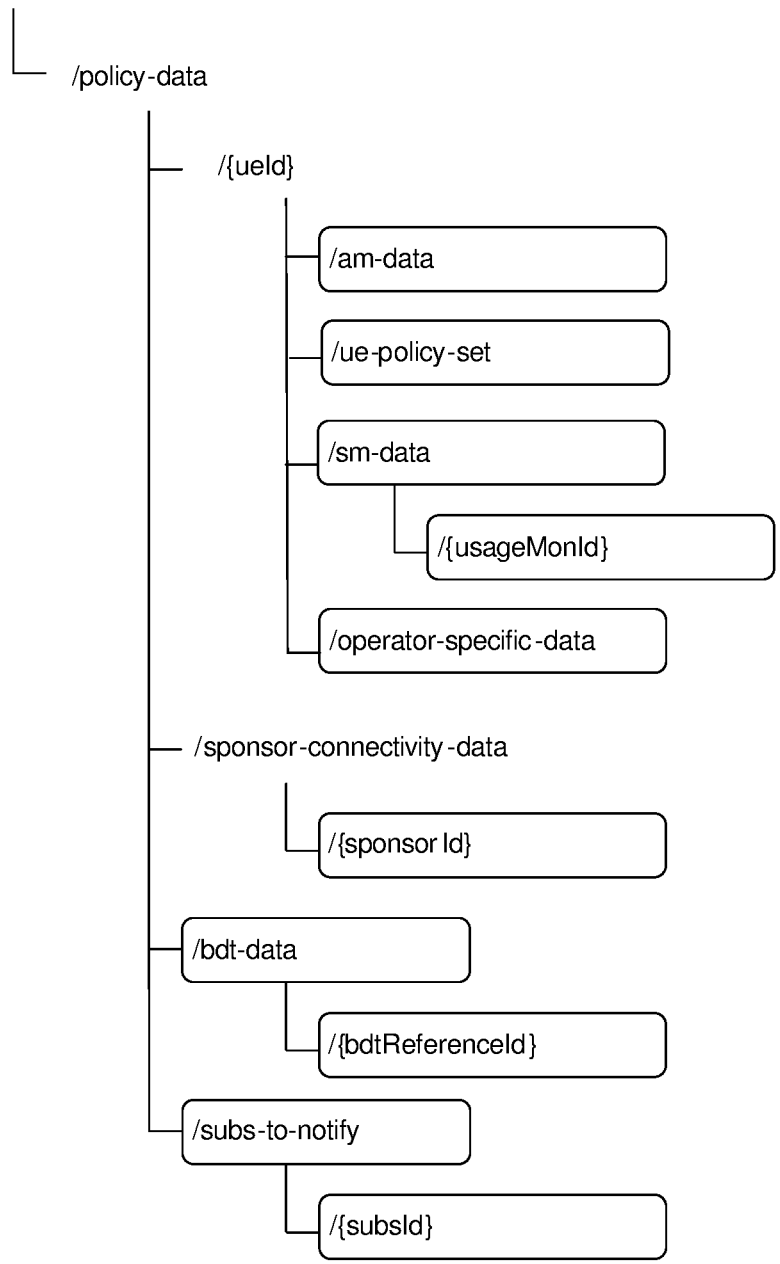
FIG. 1 illustrates an example resource structure.

As noted above, TS 29.519 specifies the interface between the PCF and the UDR. According to TS 29.519, a specific resource is defined to control the usage monitoring information. The usage monitoring information is stored according to this structure: {apiRoot}/nudr-dr/v1/policy-data/{ueId}/sm-data/{usageMonId}. The resource structure is shown in FIG. 1.

The proposed solution requires changes to the current version of TS 29.519. Section 5.4.2 of TS 29.519 defines various structured data types. One of the defined structured data types is the "UsageMonDataLimit" type, which is defined in table 5.4.2.6-1 of TS 29.519. This table is shown below:

| Attribute name | Data type | P | Cardinality | Description |
| --- | --- | --- | --- | --- |
| monKey | String | M | 1 | Identifies the usage monitoring control instance. |
| umLevel | UsageMonLevel | O | 0 . . . 1 | Indicates the scope of the usage monitoring instance (PDU Session level or per Service |
| startDate | DateTime | O | 0 . . . 1 | Start date and time when the usage monitoring instance applies |
| endDate | DateTime | O | 0 . . . 1 | End date and time when the usage monitoring instance applies |
| usageLimit | UsageThreshold | O | 0 . . . 1 | Maximum allowed traffic volume/time usage for a usage monitoring instance. |
| resetPeriod | DateTime | O | 0 . . . 1 | Time period to reset the accumulated consumed usage for a periodic usage monitoring instance (postpaid subscriptions) |

The UsageMonDataLimit type may change over time to include other attributes. For example, the UsageMonDataLimit type may also include an attribute having the name "scopes." A "scopes" attribute is of type UsageMonDataScope and comprise information identifying an S-NSSAI and DNN combination to which the usageMonDataLimit instance applies.

This disclosure proposes modifying the definition such that the UsageMonDataLimit type includes an attribute named "limitId." The limitId attribute has a data type of "string", is mandatory (M), and has a cardinality of 1. The description for this new attribute is: "Identifies the limit." That is, the limitId attribute identifies a usage monitoring control instance.

Another one of the defined structured data types is the "UsageMonData" type, which is currently defined in table 5.4.2.7-1 of TS 29.519, which is shown below:

| Attribute name | Data type | P | Cardinality | Description | Applicability |
| --- | --- | --- | --- | --- | --- |
| monKey | String | M | 1 | Identifier to a usage monitoring control instance that includes one or more | |

| Attribute name | Data type | P | Cardinality | Description | Applicability |
|---|---|---|---|---|---|
| umLevel | UsageMonLevel | O | 0 ... 1 | PCC rules Indicates the scope of the usage monitoring instance (PDU Session level or per Service | |
| allowedUsage | UsageThreshold | O | 0 ... 1 | Remaining allowed traffic volume usage and/or resource time usage. | |

This disclosure proposes replacing the "monKey" attribute with an attribute named "limitId." The limitId attribute has a data type of "string", is mandatory (M), and has a cardinality of 1. The description for this new attribute is: "Identifies the limit as defined in the 'limitId' attribute of the UsageMonDataLimit data type (see subclause 5.4.2.6 of TS 29.519)."

The UsageMonData type may change over time to include other attributes. For example, the UsageMonData type may also include an attribute having the name "resetTime." A "resetTime" attribute is of type DateTime and comprise information indicating a time at which to reset an allowed usage back to the usageLimit of the corresponding UsageMonDataLimit.

Section 5.2.6 of TS 29.519 describes the "UsageMonitoringInformation" resource. As explained in section 5.2.6.1 of TS 29.519, the UsageMonitoringInformation "resource represents an individual usage monitoring resource created in the UDR and associated with a ueId and a usageMonId."

Section 5.2.6.2 of TS 29.519 provides the "Resource Definition." Specifically, the section provides that the resource identifier for the resource is: "{apiRoot}/nudr-dr/v1/policy-data/{ueId}/sm-data/{usageMonId}". Section 5.2.6.2 of TS 29.519 currently defines the variables apiRoot, ueId, and usageMonId as shown in the table below (which corresponds to Table 5.2.6.2-1 of TS 29.519).

| | |
|---|---|
| apiRoot | See 3GPP TS 29.504 [6] |
| ueId | Represents the Subscription Identifier SUPI or GPSI (see 3GPP TS 23.501 [2] clause 5.9.2) pattern: "(imsi-[0-9]{5,15}\|nai-.+\|msisdn-[0-9]{5, 15}\|extid-.+\|.+)" |
| usageMonId | Unique identifier of the individual SM Policy usage monitoring resource. |

This disclosure further extends the definition of usageMonId, such that the usageMonId variable is not only a "unique identifier of the individual SM Policy usage monitoring resource," but also contains the identity of the corresponding limit as defined in the "limitId" attribute of the UsageMonDataLimit data type, as described above. This disclosure further proposes to change the technical specification such that no URI query parameters are supported by the GET method for the UsageMonitoringInformation resource.

Figure 2:
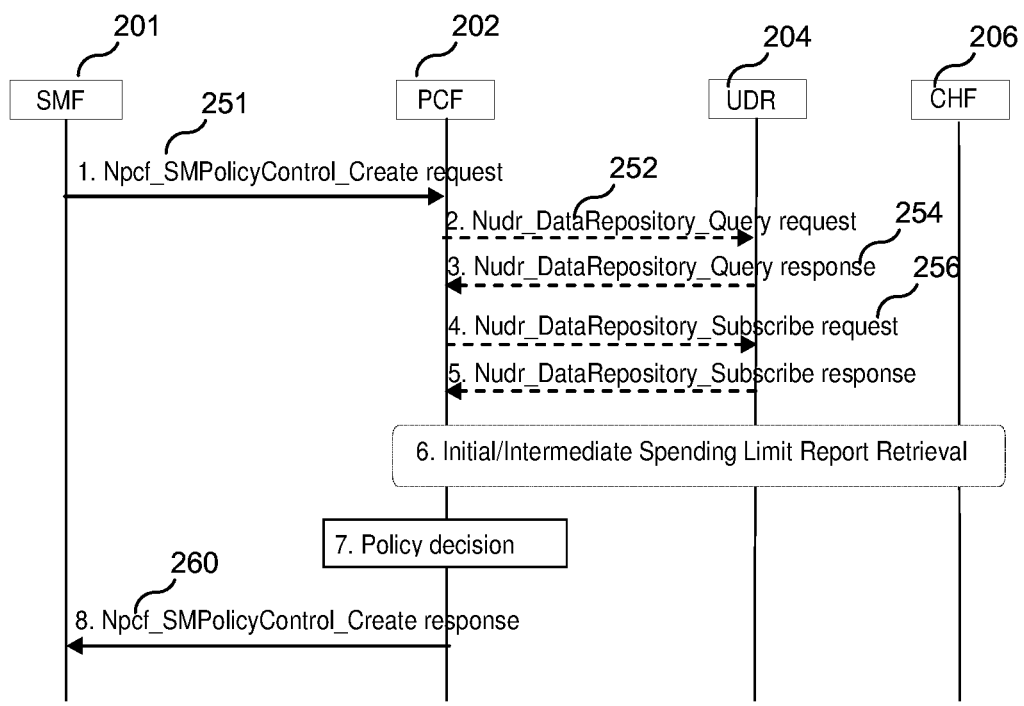
FIG. 2 is an example message flow diagram.

FIG. 2 is a message flow diagram showing, for example, a PCF 202 communicating with a UDR 204. UDR 204 is the subscriber repository where the PCF 202 stores and retrieves policy data for a user, a S-NSSAI, and a DNN. Details for the interactions with the UDR in the PCC flows have been agreed in C3-186391 (currently available at www.3gpp.org/FTP/Meetings_3GPP_SYNC/CT3/Inbox/C3-186391.zip).

This procedure shown in FIG. 2 concerns both roaming and non-roaming scenarios. In the home routed roaming case, the PCF 202 acts as the H-PCF. In the LBO roaming case, the PCF 202 acts as the V-PCF, and the step 2 to 4 may be skipped.

Step 1: The SMF 201 receives a PDU session establishment request from a user equipment (UE). That is, the SMF 201 receives a PDU session establishment request transmitted by the UE towards the SMF. The SMF 201 selects a PCF as described in subclause 8.3 of TS 29.513 and invokes the Npcf_SMPolicyControl_Create service operation by sending the HTTP POST request to the resource URI "{apiRoot}/npcf-smpolicycontrol/v1/sm-policies". The request operation provides the SUPI, the PDU session ID, PDU Session Type, DNN, and S-NSSAI, and may provide the GPSI, the Internal Group Identifier, the Access Type, the IPv4 address or the IPv6 network prefix (if available), the PEI if received in the SMF 201, the User Location Information, the UE Time Zone, Serving Network, RAT type, charging information, the subscribed Session-AMBR and the subscribed default 5QI/ARP, if available. The request operation also includes a Notification URI to indicate to the PCF where to send a notification when the SM related policies are updated.

Step 2: The PCF 202 determines whether it has subscription data for the SUPI and DNN. If the PCF 202 does not have the subscription data for the SUPI and DNN, the PCF 202 invokes the Nudr_DataRepository_Query service operation to the UDR 204 (e.g., the PCF 202 sends to the UDR 204 an HTTP GET request identifying the resource URI: {apiRoot}/nudr-dr/v1/policy-data/{ueId}/sm-data, as specified in TS 29.519.

Step 3: The UDR 204 receives the GET request and then sends an HTTP "200 OK" response to the PCF 202. The response includes the resources under {apiRoot}/nudr-dr/v1/policy-data/{ueId}/sm-data, which contain the UsageMonDataLimit applicable instances with the limits definition, and the UsageMonData applicable instances, with the usage consumption information.

Note that UsageMonDataLimit instances are stored in the . . . /sm-data resource, and UsageMonData instances are stored in the /{usageMonId} resource, and both are retrieved with the GET request to the . . . /sm-data Resource URI Each UsageMonDataLimit instance contains the "limitId" attribute identifying the name of the limit (e.g. "limitId": "Facebook-limit") together with the defined usageLimit (e.g. "usageLimit": "500 MB") and other optional parameters.

Each UsageMonData instance contains the "limitId" attribute identifying the name of the limit (e.g. "limitId": "Facebook-limit") together with the remaining usage in the "allowedUsage" attribute (e.g. "allowedUsage": "200 MB")

The UDR 204 provides the UsageMonData per existing {usageMonId}. The UsageMonData includes the limitId instead of the monitoringKey.

Step 4: When the PCF 202 receives the response transmitted by the UDR 204, the PCF 202 detects whether the response includes a UsageMonDataLimit instance for the UE. If the PCF 202 detects that there is a UsageMonDataLimit for the UE, the PCF 202 may request the UDR 204 to provide notifications to the PCF 202 when changes occur to the UsageMonData instance associated with the UsageMonDataLimit instance (i.e., the UsageMonData instance that contains the same limitId that is contained in and identifies the UsageMonDataLimit instance). The PCF 202 requests these notifications from the UDR 204 by invoking Nudr_DataRepository_Subscribe service operation (e.g., transmitting to the UDR 204 an HTTP message comprising the URI: {apiRoot}/nudr-dr/v1/policy-data/{ueId}/sm-data/{usageMonId}", where the "usageMonId" is the "limitId" contained in the received UsageMonDataLimit instance. Note PCF 202 may also subscribe to receive notification of changes on the data represented in the sm-data resource.

Step 5: The UDR 204 sends an HTTP "201 Created" response to acknowledge the subscription from the PCF 202.

Step 6: If the PCF 202 determines that the policy decision depends on the status of the policy counters available at the CHF 206, and such reporting is not established for the subscriber, the PCF 202 initiates an Initial Spending Limit Report Retrieval as defined in subclause 5.3.2 of 3GPP TS 29.594 V15.1.0. If policy counter status reporting is already established for the subscriber, and the PCF 202 determines that the status of additional policy counters are required, the PCF 202 initiates an Intermediate Spending Limit Report Retrieval as defined in subclause 5.3.3 of 3GPP TS 29.594 V15.1.0.

Step 7: The PCF 202 makes the policy decision to determine the information provided in step 6.

Step 8: The PCF 202 sends an HTTP "201 Created" response to the SMF 201 with the determined policies as described in subclause 4.2.2 of 3GPP TS 29.512 V15.1.0. After this step the PCF 202 can subscribe to SMF 201 events associated with the PDU Session.

Figure 3:
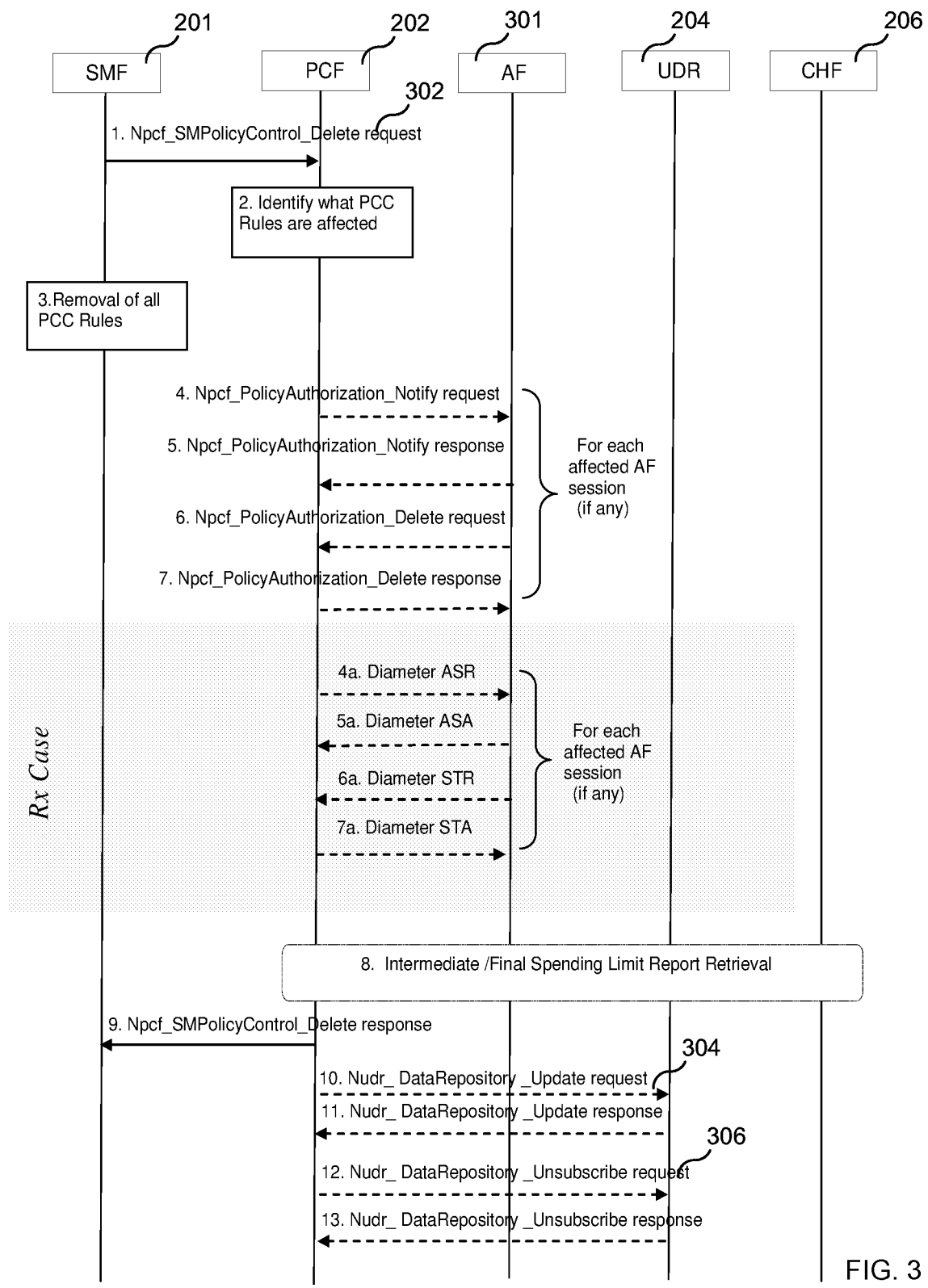
FIG. 3 is an example message flow diagram.

FIG. 3 is another message flow diagram showing communications between various functions including the PCF 202 and the UDR 204.

Step 1: The SMF 201 invokes the Npcf_SMPolicyControl_Delete service operation by sending the HTTP POST request with "{apiRoot}/npcf-smpolicycontrol/v1/sm-policies/{smPolicyId}/delete" as the resource URI to request the PCF to delete the context of the SM related policy. The request operation may include usage monitoring information (if applicable) and access network information.

Step 2: Upon receipt of Npcf_SMPolicyControl_Delete service operation, the PCF identifies the PCC Rules that require an AF 301 to be notified and removes PCC Rules for the PDU Session.

Step 3: The SMF 201 removes all the PCC Rules which are applied to the PDU session.

Step 4: The PCF 202 invokes the Npcf_PolicyAuthorization_Notify service operation by sending the HTTP POST request with "{notifUri}/notify" as the resource URI to the AF 301 to indicate that there are no transmission resources for the service if this is requested by the AF 301.

Step 5: The AF 301 sends an HTTP "204 No Content" response to the PCF 202.

Step 6: The AF 301 invokes the Npcf_PolicyAuthorization_Delete service operation by sending the HTTP POST request to the resource URI "{apiRoot}/npcf-policyauthorization/v1/app-sessions/{appSessionId}/delete". The request may include the events to subscribe to.

Step 7: The PCF 202 removes the AF application session context and sends an HTTP "204 No Content" response to the AF. If the PCF 202 need to report usage data or the access network information, it sends an HTTP "200 OK" response. If usage thresholds were provided by the AF earlier, and the PCF 202 has usage data that has not yet been reported to the AF, the PCF 202 informs the AF 301 about the resources that have been consumed by the user since the last report. If the SMF 201 in step 1 reports the access network information and if the AF 301 requested the PCF 202 to report access network information previously, the PCF 202 informs the AF 301 about the access network information. The PCF 202 also deletes the subscription to PCF 202 detected events for that AF application session.

Step 4a: The PCF 202 indicates the session abort to the AF 301 by sending a diameter ASR to the AF 301.

Step 5a: The AF 301 responds by sending a diameter ASA to the PCF 202.

Step 6a: The AF 301 sends a diameter STR to the PCF 202 to indicate that the session has been terminated.

Step 7a: The PCF 202 responds by sending a diameter STA to the AF 301. Steps 4a, 5a, 6a, and 7a are for the "Rx" case, i.e., when the PCF 202 support the Rx interface with the AF 301. Details of the Rx interface can be found in 3GPP TS 29.214 V15.4.0.

Step 8: If this is the last PDU session for this subscriber the Final Spending Limit Report Request as defined in clause 5.3.4 of 3GPP TS 29.594 V15.1.0 is sent. If any existing PDU sessions for this subscriber require policy counter status reporting, the Intermediate Spending Limit Report Request as defined in clause 5.3.3 of 3GPP TS 29.594 V15.1.0 can be sent to alter the list of subscribed policy counters.

Step 9: The PCF 202 removes PCC Rules for the terminated PDU Session and sends an HTTP "204 No Content" response to the SMF 201.

Step 10: At SM Policy Association Termination, the PCF 202 updates the remaining usage in the UDR for the applicable limits. The PCF 202 can send a PATCH request to the . . . /sm-data resource URI including the updated values of the remaining usage in the "allowedUsage" attribute included in the corresponding "UsageMonData" instances, where each "UsageMonData" instance is identified by its "limitId" (e.g. "limitId": "Facebook-limit" and "allowedUsage": "125 MB"). Alternatively, the PCF 202 can send a PUT request to the . . . /{usageMonId} resource URI per each "UsageMonData" instance the PCF 202 needs to update. The "usageMonId" value is the "limitId" value (e.g. . . . /facebook-limit resource URI for Facebook consumption, and . . . /netflix-premium resource URI for Netflix premium consumption). UDR stores the remaining usage related to the limitId (instead of using the monitoring key).

Step 11: The UDR 204 sends an HTTP "204 No Content" response to the PCF 202.

Step 12: The PCF 202 may unsubscribe to receive changes related to the Resource ID . . . /{usageMonId} identified by the limitId. Note that the PCF 202 may also unsubscribe to receive notification of changes on the data represented in the sm-data resource. To terminate the subscription to changes in the usage monitoring data represented in the . . . /{usageMonId}, the PCF 202 may send a PUT request to the resource URI: {apiRoot}/nudr-dr/v1/policy-data/subs-to-notify. The body of this PUT request includes a PolicyDataSubscription data structure with an updated list of "monitoredResourceUris," which list would not include the before mentioned . . . /{usageMonId} resource URI. Alternatively, the PCF 202 may terminate the subscription to notification to any data change by sending a DELETE request to the {apiRoot}/nudr-dr/v1/policy-data/subs-to-notify resource URI.

Step 13. The UDR 204 sends an HTTP "204 No Content" response to the PCF 202.

Figure 4:
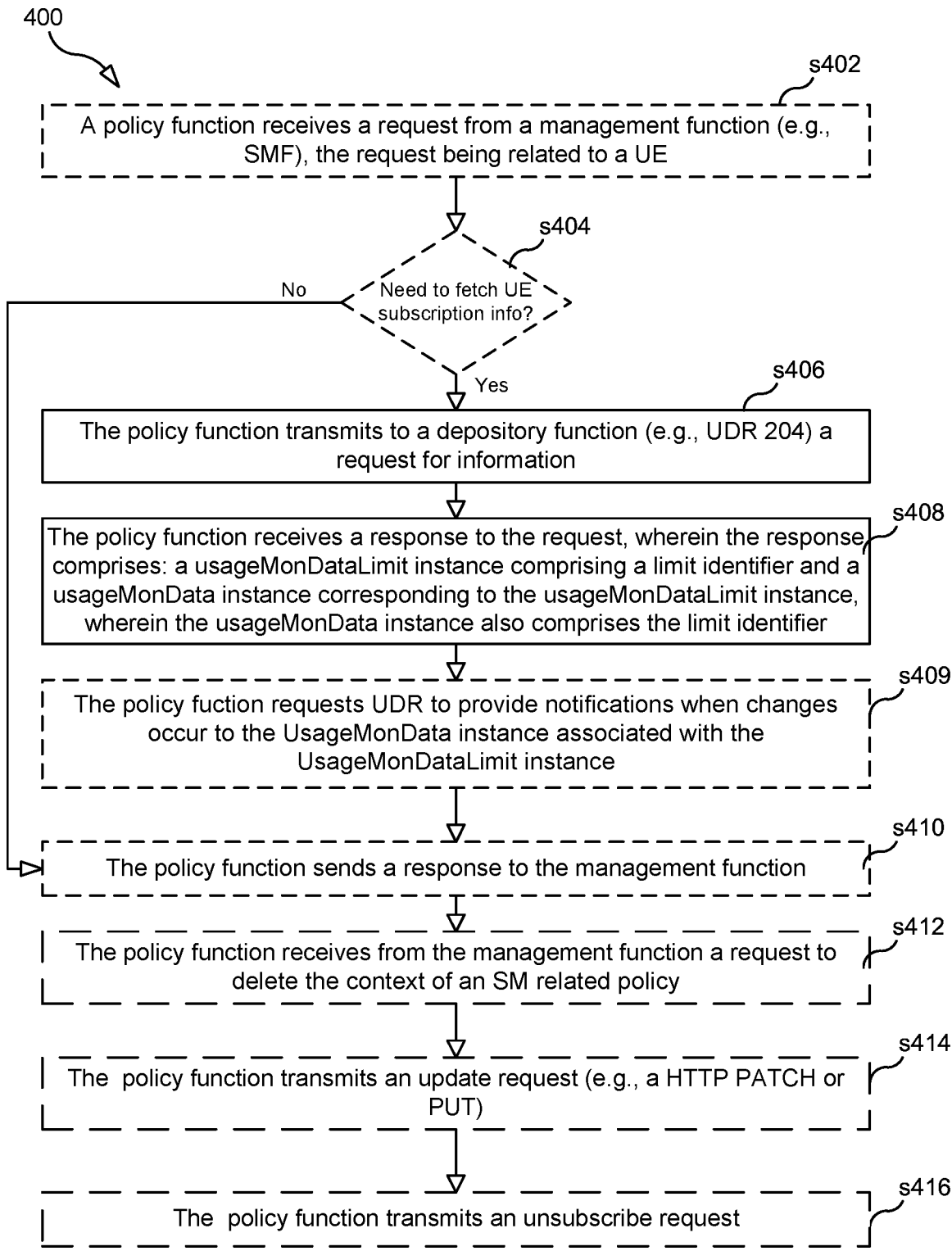
FIG. 4 is a flow chart illustrating a process according to an embodiment.

FIG. 4 is a flow chart illustrating a process 400 according to an embodiment. Process 400 may begin in step s402.

Step s402 comprises a policy function (e.g., PCF 202) receiving a request 251 (see FIG. 2) from a management function (e.g., SMF 201), the request being related to a UE. That is, the management function transmitted the request 251 towards the policy function such that the policy function receives the request (directly or indirectly) from the management function.

Step s404 comprises the policy function determining whether or not it needs to fetch from a depository function (e.g., UDR 204) information pertaining to the UE. If the policy function needs to fetch the information, process 400 proceeds to step 406, otherwise it proceeds to step 410.

Step s406 comprises the policy function transmitting to the depository function a request 252 for information. That is, for example, in embodiments in which the policy function is implemented in software, the software instructs the hardware on which it runs to transmit the request 252.

Step s408 comprises the policy function receiving a response 254 to the request, wherein the response was transmitted by the depository function and the response comprises: a usageMonDataLimit instance comprising a limit identifier and a usageMonData instance corresponding to the usageMonDataLimit instance, wherein the usageMonData instance also comprises the limit identifier. When the policy function receives the response from the depository function (directly or indirectly), the policy function detects whether the response includes a UsageMonDataLimit instance for the UE. If the policy function detects that there is a UsageMonDataLimit for the UE, the policy function performs step s409.

Step s409 comprises the policy function transmitting to the depository function a request 256 to provide notifications when changes occur to the UsageMonData instance associated with the UsageMonDataLimit instance.

Step s410 comprises the policy function sending a response 260 to the management function.

Step s412 comprises the policy function receiving (directly or indirectly) from the management function a request 302 to delete the context of an SM related policy.

Step s414 comprises the policy function transmitting an update request 304 to the depository function (e.g., a HTTP PATCH or PUT as described above with respect to step 10 of FIG. 3).

Step s416 comprises the policy function transmitting an unsubscribe request 306 to the depository function as described above with respect to step 12 of FIG. 3.

Figure 5:
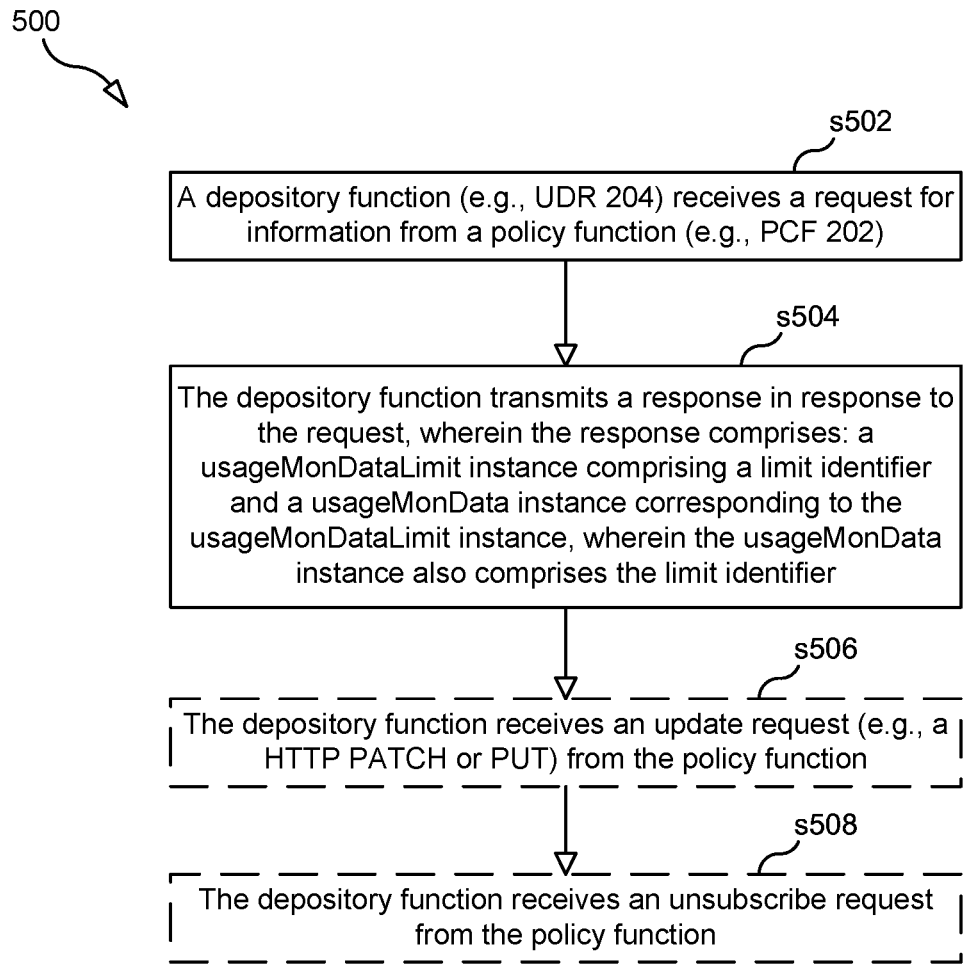
FIG. 5 is a flow chart illustrating a process according to an embodiment.

FIG. 5 is a flow chart illustrating a process 500 according to an embodiment. Process 500 may begin in step s502.

Step s502 comprises a depository function (e.g., UDR 204) receiving a request 252 for information from a policy function (e.g., PCF 202).

Step s504 comprises the depository function transmitting a response 254 in response to the request 252, wherein the response comprises: a usageMonDataLimit instance comprising a limit identifier and a usageMonData instance corresponding to the usageMonDataLimit instance, wherein the usageMonData instance also comprises the limit identifier.

Step s506 comprises the depository function receiving an update request 304 (e.g., a HTTP PATCH or PUT as described above with respect to step 10 of FIG. 3) from the policy function.

Step s508 comprises the depository function receiving an unsubscribe request 306 from the policy function as described above with respect to step 12 of FIG. 3.

Figure 6:
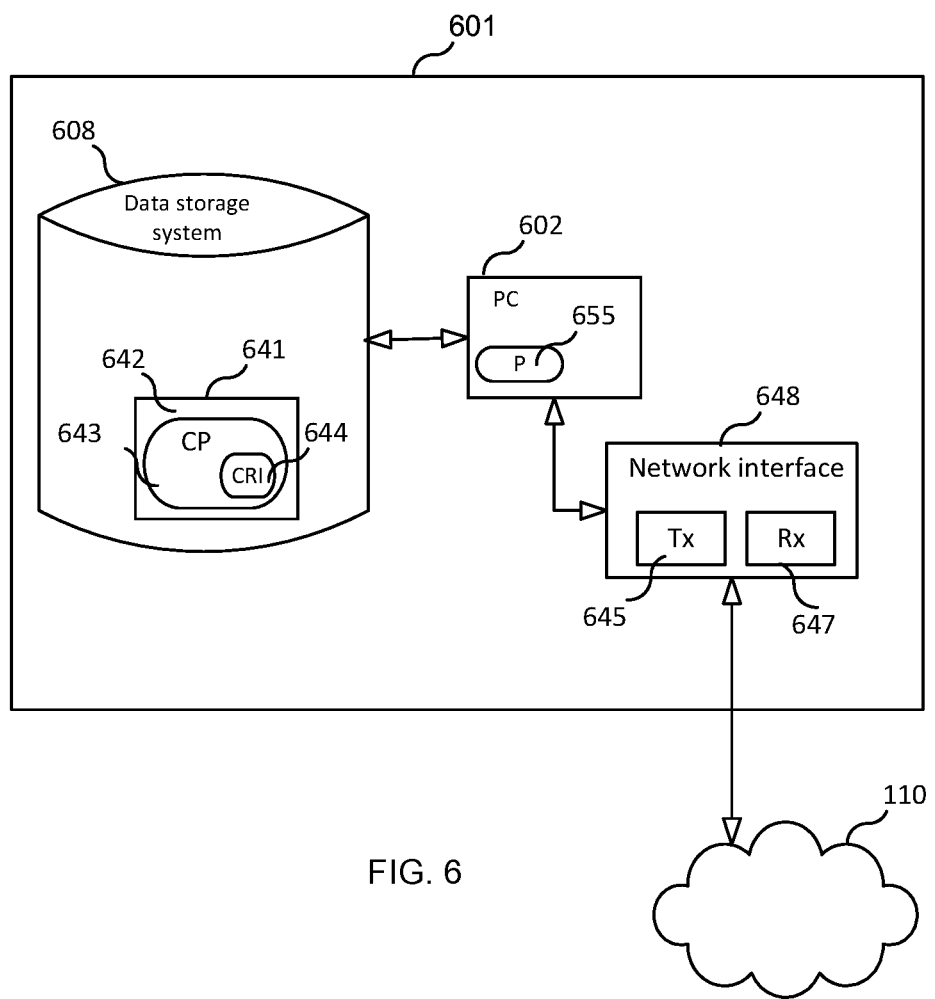
FIG. 6 is a block diagram of an apparatus according to one embodiment.

FIG. 6 is a block diagram of an apparatus 601 for implementing a PCF 202 or a UDR 204, according to some embodiments. For example, in embodiments where the PCF 202 and/or the UDR 204 consist of software (e.g., scripts and/or compiled code), apparatus 601 can execute the PCF/UDR software. Accordingly, apparatus 601 may be referred to as a policy function apparatus in embodiments in which apparatus 601 executes PCF software. Likewise, apparatus 601 may be referred to as a depository function apparatus in embodiments in which apparatus 601 executes UDR software. As shown in FIG. 6, apparatus 601 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 648 comprising a transmitter (Tx) 645 and a receiver (Rx) 647 for enabling apparatus 601 to transmit data to and receive data from other nodes connected to a network 110 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes apparatus 601 to perform steps described herein (e.g., steps described herein with reference to the flow charts). In other embodiments, apparatus 601 may be configured to perform steps described herein without the need for code. That is, for example, PC 602 may consist merely of one or more ASICs. Hence, the features of the embodiments described herein may be implemented in hardware and/or software.

Embodiments

A1. A method (400), comprising: a policy function (e.g., PCF 202) transmitting (s406) to a depository function (e.g., UDR 204) a request (252) for information, wherein the depository function is configured to transmit a response (254) in response to the request; and the policy function receiving (s408) the response, wherein the response comprises: a usageMonDataLimit instance comprising a limit identifier; and a usageMonData instance corresponding to the usageMonDataLimit instance, wherein the usageMonData instance also comprises the limit identifier.

A2. The method of embodiment A1, further comprising: prior to transmitting the request (252), the policy function receiving (s402) a request (251) transmitted by a management function (e.g., SMF) and the policy function determining (s404) whether or not it needs to fetch the information from the depository function.

B1. A method, comprising: a depository function (e.g., UDR 204) receiving a request for information transmitted by a policy function (e.g., PCF 202); and the depository function transmitting a response in response to the request, wherein the response comprises: a usageMonDataLimit instance comprising a limit identifier; and a usageMonData instance corresponding to the usageMonDataLimit instance, wherein the usageMonData instance also comprises the limit identifier.

B2. The method of embodiment B1, further comprising the depository function receiving (s506) an update request (304) transmitted by the policy function B3. The method of embodiment B2, wherein the update request is an HTTP PATCH request comprising a UsageMonData instance comprising the limit identifier.

B4. The method of embodiment B2, wherein the update request is an HTTP PUT request comprising a resource identifier (e.g., a URI) comprising the limit identifier.

B5. The method of any one of embodiments B1-B4, further comprising the depository function receiving (s508) an unsubscribe request (306) transmitted by the policy function.

B6. The method of embodiment B5, wherein the unsubscribe request is an HTTP PUT request comprising a body comprising a resource identifier comprising the limit identifier.

C1. An apparatus (601), the apparatus being adapted to: transmit (s406) to a depository function (e.g., UDR 204) a request (252) for information, wherein the UDR 204 is configured to transmit a response (254) in response to the request; and receive (s408) the response, wherein the response comprises: a usageMonDataLimit instance comprising a limit identifier; and a usageMonData instance corresponding to the usageMonDataLimit instance, wherein the usageMonData instance also comprises the limit identifier.

C2. The apparatus of embodiment A1, wherein the apparatus is further adapted to: prior to transmitting the request (252), determine (s404) whether or not to fetch the information from the depository function after receiving a request (251) transmitted by a management function.

D1. An apparatus (601), the apparatus being adapted to: receive a request for information transmitted by a policy function (e.g., PCF 202); and transmit a response in response to the request, wherein the response comprises: a usageMonDataLimit instance comprising a limit identifier; and a usageMonData instance corresponding to the usageMonDataLimit instance, wherein the usageMonData instance also comprises the limit identifier.

D2. The apparatus of embodiment D1, wherein the apparatus is further adapted to perform the method of any one of embodiments B2-B6.

The following illustrates changes to TS 29.519 that have been proposed.

1st Change 5.2.6.2 Resource Definition

Resource URI: {apiRoot}/nudr-dr/v1/policy-data/{ueId}/sm-data/{usageMonId}

This resource shall support the resource URI variables defined in the table below.

TABLE 5.2.6.2-1

Resource URI variables for this resource

| Name | Definition |
| --- | --- |
| apiRoot | See 3GPP TS 29.504 [6] |
| ueId | Represents the Subscription Identifier SUPI or GPSI (see 3GPP TS 23.501 [2] clause 5.9.2) pattern: "(imsi-[0-9]{5,15}\|nai-.+\|msisdn-[0-9]{5, 15}\|extid-.+\|.+)" |
| usageMonId | Unique identifier of the individual SM Policy usage monitoring resource. It contains the identity of the corresponding limit as defined in the "limitId" attribute of the UsageMonDataLimit data type (see subclause 5.4.2.6. |

2nd Change 5.2.6.3.3 GET

This method shall support the URI query parameters specified in the table below

TABLE 5.2.6.3.3-1

URI query parameters supported by the GET method on this resource

| Name | Data type | P | Cardinality | Description |
| --- | --- | --- | --- | --- |
| N.A. | | | | |

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. Also, the phrase "receiving from" should construed to cover receiving directly from or receiving indirectly from. That is, a first entity receives a message from a second entity even in the case where a third entity receives the message transmitted by the second entity and then forwards the message to the first entity.

Abbreviations

AF Application function
AMBR Aggregate maximum bit rate
APN Access point name
ARP Allocation and retention priority
ASA Abort-Session-Answer
ASR Abort-Session-Request
CHF Charging Function
DNN Data network name
HTTP Hypertext Transfer Protocol
IP-CAN IP connectivity access network
GPSI General public subscription identifier
H-PCF Home policy control function
PCC Policy and charging control
PCF Policy control function
PCRF Policy and changing rules function PDU Protocol Data Unit
PEI Permanent equipment identifier
PGW Packet data network gateway
RAT Radio access technology
SM Short message (?)
SMF Session management function
SPR Subscription profile repository
STA Session-termination-answer
STR Session-termination-request
SUPI Subscription permanent identifier
S-NSSAI Single network slice selection assistance information
UDR Unified data repository
UP User plane
UPF User plane function
V-PCF Visited policy control function
5QI 5G Quality of service (QoS) identifier

The invention claimed is:

1. A method, comprising:
a policy function transmitting to a depository function a request for session management policy data for a subscriber, wherein the request for the session management policy data for the subscriber comprises a subscription identifier; and
the policy function receiving from the depository function a response responsive to the request for the session management policy data, wherein the response to the request for the session management (SM) policy data comprises:
  i) a usageMonDataLimit instance comprising a limit identifier for identifying the usageMonDataLimit instance; and
  ii) a usageMonData instance corresponding to the usageMonDataLimit instance, wherein the usageMonData instance also comprises the limit identifier for identifying the usageMonDataLimit instance, wherein
the usageMonDataLimit instance further comprises:
  a usage monitoring level instance indicating whether the usageMonDataLimit instance applies at a session level or a service level,
  start date information indicating a start date and time,
  end date information indicating an end date and time,
  a usage limit threshold value indicating a maximum allowed traffic volume, and/or
  a reset period for use in indicating a time at which an allowed usage needs to be reset.

2. The method of claim 1, further comprising:
prior to transmitting the request, the policy function receiving a request from a management function; and
in response to the request, the policy function determining whether or not the policy function needs to fetch the SM policy data from the depository function.

3. The method of claim 1, further comprising the policy function transmitting to the depository function a request requesting the depository function to provide a notification to the policy function when changes occur to the UsageMonData instance associated with the UsageMonDataLimit instance.

4. The method of claim 1, wherein the request for the SM policy data for the subscriber is an HTTP GET request.

5. The method of claim 1, wherein
the method further comprises the policy function transmitting to the depository function an update request, and
the update request is an HTTP PATCH request comprising a UsageMonData instance comprising the limit identifier, or
the update request is an HTTP PUT request comprising a resource identifier comprising the limit identifier.

6. The method of claim 1, further comprising the policy function transmitting to the depository function an unsubscribe request, wherein transmitting the unsubscribe request comprises transmitting an HTTP PUT request comprising a body comprising a resource identifier comprising the limit identifier.

7. The method of claim 1, wherein the usageMonDataLimit instance further comprises a data scope indicating an S-NSSAI and DNN combination to which the usageMonDataLimit instance applies.

8. The method of claim 1, wherein the usageMonData instance further comprises:
a usage monitoring level (umLevel) instance indicating whether the usageMonData instance applies at a session level or at a service level, and/or
an allowed usage value, wherein the allowed usage value indicates a remaining allowed traffic volume, and/or the allowed usage value indicates a remaining length of time.

9. The method of claim 1, wherein the usageMonData instance further comprises information indicating a time at which to reset an allowed usage to the usage limit threshold value.

10. A method comprising:
a depository function receiving a request for session management policy data for a subscriber, wherein the request for the session management policy data for the subscriber comprises a subscription identifier; and
the depository function transmitting a response responsive to the request for the session management policy data, wherein the response to the request for the session management (SM) policy data comprises:
  i) a usageMonDataLimit instance comprising a limit identifier for identifying the usageMonDataLimit instance; and
  ii) a usageMonData instance corresponding to the usageMonDataLimit instance, wherein the usageMonData instance also comprises the limit identifier for identifying the usageMonDataLimit instance, wherein
the usageMonDataLimit instance further comprises:
a usage monitoring level instance indicating whether the usageMonDataLimit instance applies at a session level or a service level,
start date information indicating a start date and time,
end date information indicating an end date and time,
a usage limit threshold value indicating a maximum allowed traffic volume, and/or
a reset period for use in indicating a time at which an allowed usage needs to be reset.

11. The method of claim 10, wherein
the request for the SM policy data for the subscriber is an HTTP GET request.

12. The method of claim 10, wherein
the method further comprises the depository function receiving an update request from the policy function, and
the update request is an HTTP PATCH request comprising a UsageMonData instance comprising the limit identifier, or
the update request is an HTTP PUT request comprising a resource identifier comprising the limit identifier.

13. The method of claim 10, further comprising the depository function receiving an unsubscribe request from the policy function.

14. The method of claim 13, wherein the unsubscribe request is an HTTP PUT request comprising a body comprising a resource identifier comprising the limit identifier.

15. The method of claim 10, wherein the usageMonDataLimit instance further comprises a data scope indicating an S-NSSAI and DNN combination to which the usageMonDataLimit instance applies.

16. The method of claim 10, wherein the usageMonData instance further comprises:
   a usage monitoring level (umLevel) instance indicating whether the usageMonData instance applies at a session level or at a service level, and/or
   an allowed usage value, wherein the allowed usage value indicates a remaining allowed traffic volume, and/or the allowed usage value indicates a remaining length of time.

17. The method of claim 15, wherein the usageMonData instance further comprises information indicating a time at which to reset an allowed usage to the usage limit threshold value.

18. A computer program product comprising a non-transitory computer readable medium storing a computer program comprising instructions which when executed by processing circuitry of an apparatus causes the apparatus to perform the method of claim 1.

19. A computer program product comprising a non-transitory computer readable medium storing a computer program comprising instructions which when executed by processing circuitry of an apparatus causes the apparatus to perform the method of claim 10.

20. A policy function apparatus, the policy function apparatus comprising:
   processing circuitry comprising at least one processor;
   a transmitter for transmitting to a depository function a request for session management policy data for a subscriber, wherein the request for the session management policy data for the subscriber comprises a subscription identifier; and
   a receiver for receiving from the depository function a response responsive to the request for the session management policy data, wherein the response to the request for the session management (SM) policy data comprises:
      i) a usageMonDataLimit instance comprising a limit identifier for identifying the usageMonDataLimit instance; and
      ii) a usageMonData instance corresponding to the usageMonDataLimit instance, wherein the usageMonData instance also comprises the limit identifier for identifying the usageMonDataLimit instance, wherein
   the usageMonDataLimit instance further comprises:
      a usage monitoring level instance indicating whether the usageMonDataLimit instance applies at a session level or a service level,
      start date information indicating a start date and time,
      end date information indicating an end date and time,
      a usage limit threshold value indicating a maximum allowed traffic volume, and/or
      a reset period for use in indicating a time at which an allowed usage needs to be reset.

21. The policy function apparatus of claim 20, wherein the policy function apparatus is adapted to:
   determine whether or not the policy function needs to fetch the SM policy data from the depository function in response to a request from a management function.

22. A depository function apparatus, the depository function apparatus comprising:
   processing circuitry comprising at least one processor;
   a receiver for receiving from a policy function a request for session management policy data for a subscriber, wherein the request for the session management policy data for the subscriber comprises a subscription identifier; and
   a transmitter for transmitting a response responsive to the request for the session management policy data, wherein the response to the request for the session management (SM) policy data comprises:
      i) a usageMonDataLimit instance comprising a limit identifier for identifying the usageMonDataLimit instance; and
      ii) a usageMonData instance corresponding to the usageMonDataLimit instance, wherein the usageMonData instance also comprises the limit identifier for identifying the usageMonDataLimit instance, wherein
   the usageMonDataLimit instance further comprises:
      a usage monitoring level instance indicating whether the usageMonData Limit instance applies at a session level or a service level,
      start date information indicating a start date and time,
      end date information indicating an end date and time,
      a usage limit threshold value indicating a maximum allowed traffic volume, and/or
      a rest period for use in indicating a time at which an allowed usage needs to be reset.

23. The depository function apparatus of claim 22, wherein the request for the SM policy data for the subscriber is an HTTP GET request.

* * * * *

UNITED STATES PATENT AND TRADEMARK OFFICE
CERTIFICATE OF CORRECTION

PATENT NO. : 12,160,448 B2  
APPLICATION NO. : 17/294649  
DATED : December 3, 2024  
INVENTOR(S) : Garcia Azorero et al.

Page 1 of 1

It is certified that error appears in the above-identified patent and that said Letters Patent is hereby corrected as shown below:

On the Title Page

Below Item (65), insert -- (60) Related U.S. Application Data Provisional application No. 62/769,095, filed on Nov. 19, 2018. --.

In Item (56), under "OTHER PUBLICATIONS", in Column 2, Line 5, delete "(pp. 1-6,10,11,14-17," and insert -- (pp. 1-6, 10, 11, 14-17, --, therefor.

On Page 2, in Item (56), under "OTHER PUBLICATIONS", in Column 2, Line 23, delete "(pp. 1-6,10,11,14-17," and insert -- (pp. 1-6, 10, 11, 14-17, --, therefor.

In the Specification

In Column 2, Line 67, delete "5-NSSAI/DNN" and insert -- S-NSSAI/DNN --, therefor.

In the Claims

In Column 18, Line 7, in Claim 20, delete "instance applies at a session level or a service level," and insert the same on Line 6, after "usageMonDataLimit" as a continuation point.

In Column 18, Line 41, in Claim 22, delete "usageMonData Limit" and insert -- usageMonDataLimit --, therefor.

In Column 18, Line 47, in Claim 22, delete "a rest" and insert -- a reset --, therefor.

Signed and Sealed this  
Twenty-first Day of October, 2025

John A. Squires  
*Director of the United States Patent and Trademark Office*